United States Patent [19]

Egner et al.

[11] Patent Number: 4,907,335
[45] Date of Patent: Mar. 13, 1990

[54] TOOL FOR ASSEMBLING OPTICAL FIBER

[75] Inventors: Walter A. Egner, Oberlin; Ronald R. Schaffer, Harrisburg; Larry R. Stauffer, Camp Hill; Gary N. Warner, Harrisburg, all of Pa.

[73] Assignee: AMP Incorporated, Harrisburg, Pa.

[21] Appl. No.: 209,257

[22] Filed: Jun. 20, 1988

[51] Int. Cl.4 .......................... B23Q 3/02; B23P 19/04
[52] U.S. Cl. ..................................... 29/283.5; 29/238; 29/241; 72/402
[58] Field of Search .................... 29/241, 237, 243.52, 29/452, 822, 234, 283.5, 238; 72/402; 350/96.17, 96.20, 96.21; 357/20; 225/2, 96

[56] References Cited

U.S. PATENT DOCUMENTS

| | | | |
|---|---|---|---|
| 3,624,870 | 12/1971 | Scheff | 29/822 X |
| 3,877,135 | 4/1975 | Heisler | 29/234 X |
| 4,148,559 | 4/1979 | Gauthier . | |
| 4,186,994 | 2/1980 | Denkin et al. | 357/17 X |
| 4,186,996 | 2/1980 | Bowen et al. | 357/17 X |
| 4,237,474 | 12/1980 | Ladany | 357/17 X |
| 4,416,506 | 11/1983 | Johnson et al. | 350/96.21 |
| 4,435,038 | 3/1984 | Soes et al. | 350/96.21 |
| 4,567,650 | 2/1986 | Balyasny et al. | 29/822 |
| 4,727,742 | 3/1988 | Weaver | 72/402 |

FOREIGN PATENT DOCUMENTS 0138674 11/1985 European Pat. Off. .
2518319 7/1976 Fed. Rep. of Germany .
2528587 12/1983 France .

OTHER PUBLICATIONS

AMP Workstation Kit 501520-1 for Optimate Mechanical Splices, 6/11/1987, AMP Incorporated.

Primary Examiner—Mark Rosenbaum
Assistant Examiner—Peter Dungba Vo
Attorney, Agent, or Firm—Gerald K. Kita

[57] ABSTRACT

Apparatus 11 and a method for assembling an optical fiber 6 in a passage 4 of a connector 1 by applying axial force to the fiber 6 to maintain an optical face 8 of the fiber 6 in abutment with an optical face 9 of an optical device 7 mounted to the connector 1, wherein, the fiber 6 is mounted along a straight passage 15 of the apparatus 11, a pin 30 mounted on a carriage 20 imparts a bend 31 along the length of the fiber 6, and the carriage 20 is displaceable to impart axial force to the fiber 6, and to apply pressure between abutting optical faces 8,9 of the fiber 6 and the optical device 7.

10 Claims, 4 Drawing Sheets

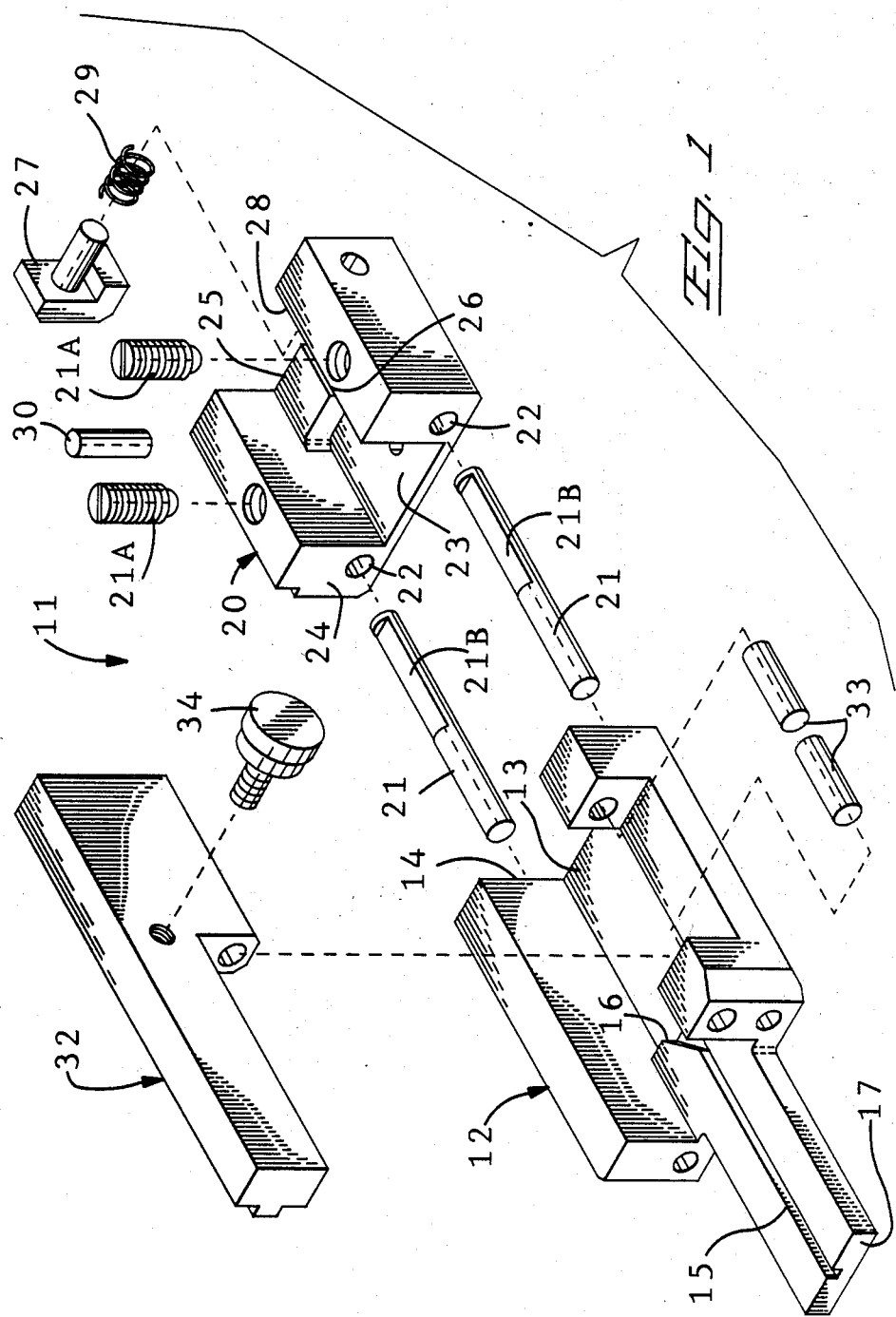

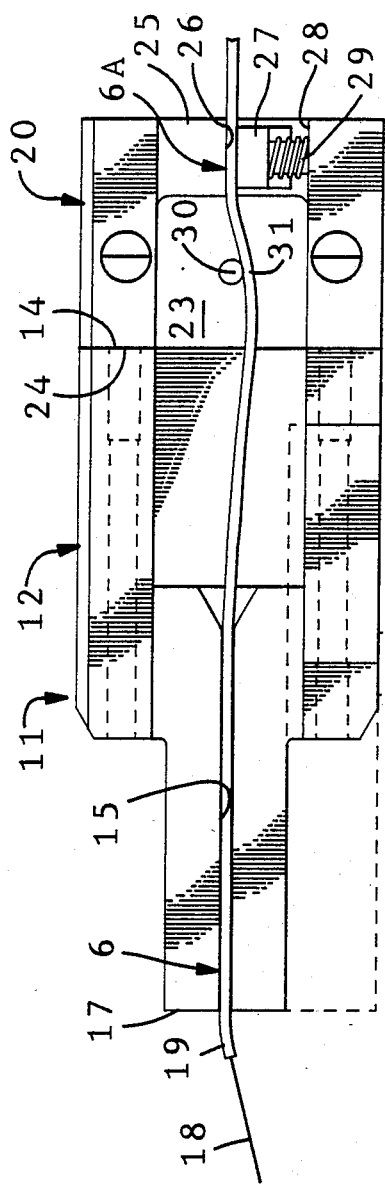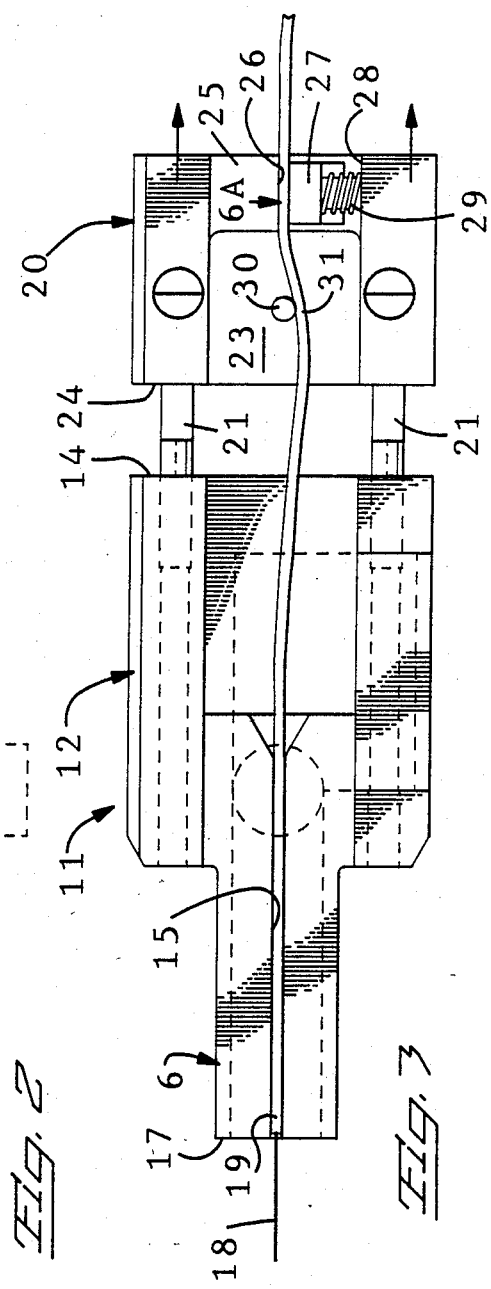

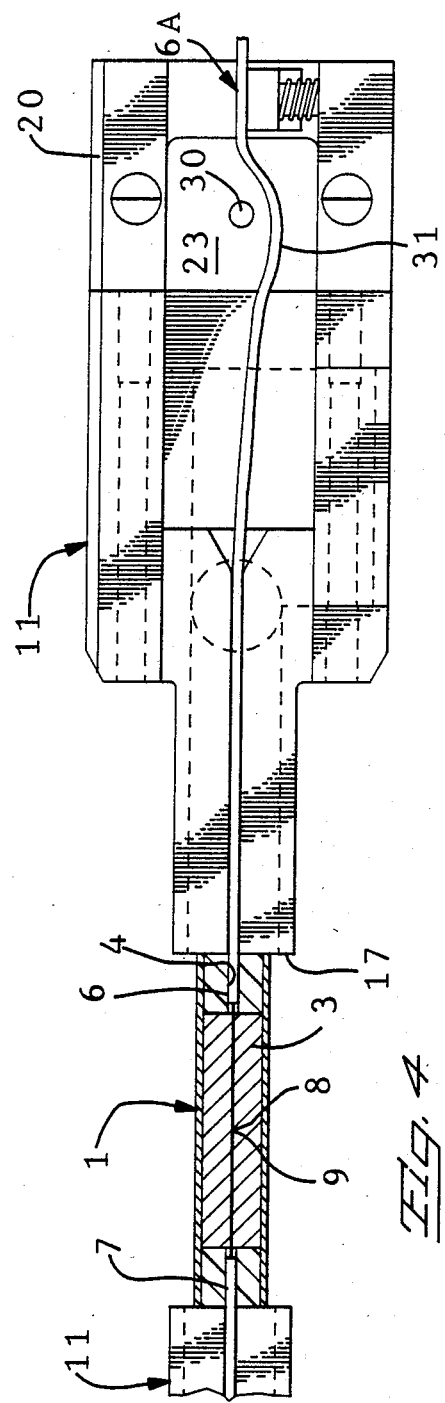
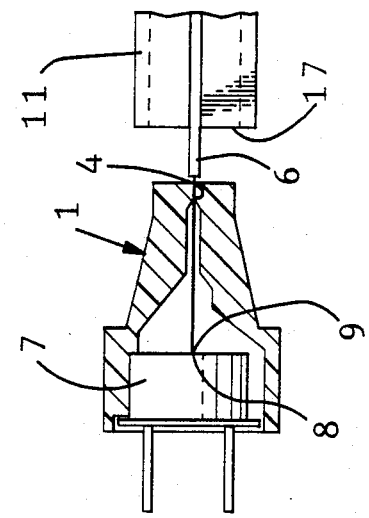
Fig. 4
Fig. 8

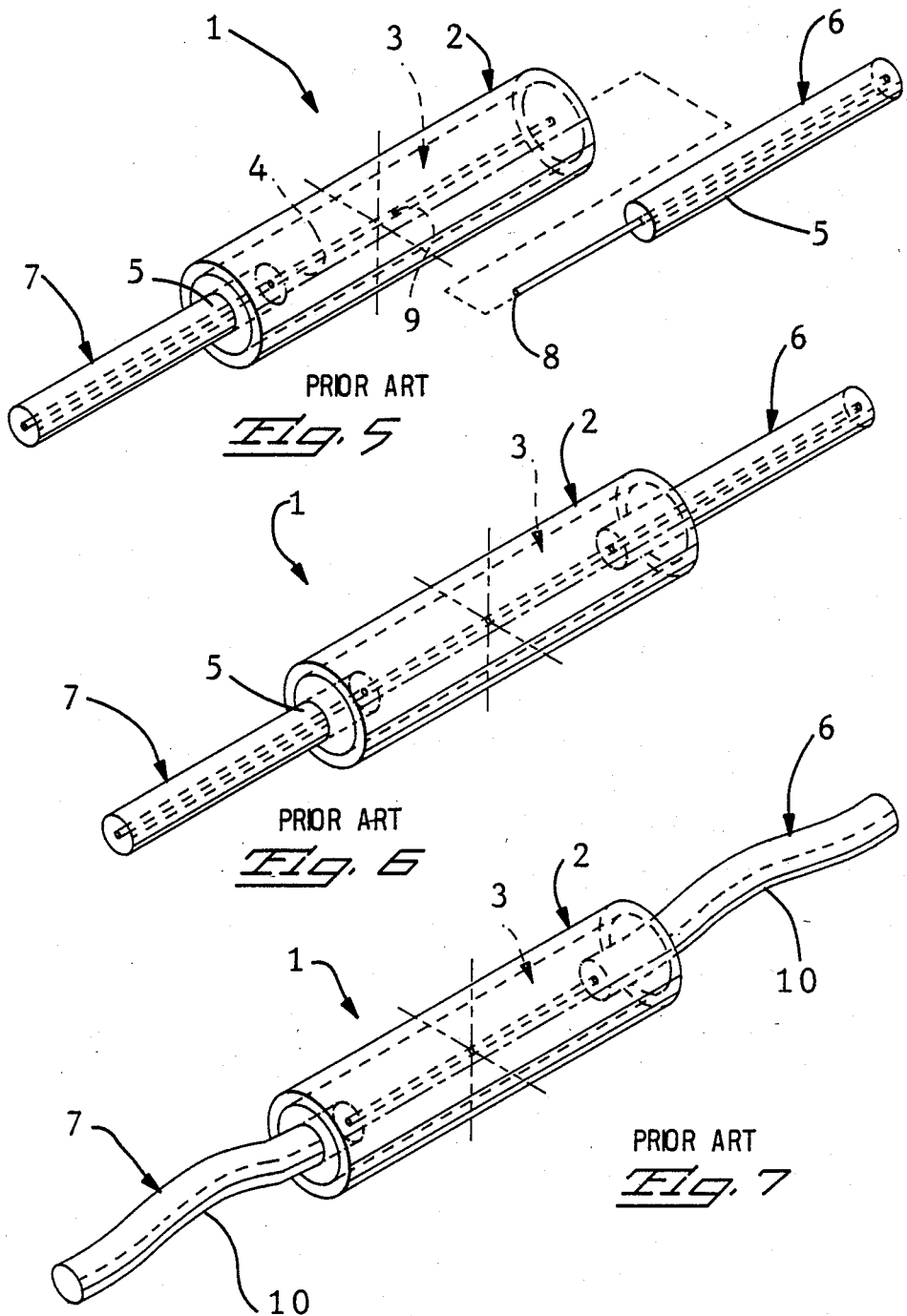

TOOL FOR ASSEMBLING OPTICAL FIBER

FIELD OF THE INVENTION

The present invention relates to abutting optical faces of a corresponding optical fiber and a corresponding optical device.

BACKGROUND OF THE INVENTION

U.S. Pat. No. 4,727,742 discloses a known connector and an apparatus for use in assembling a butt splice of two optical fibers in a passage of the connector. The apparatus includes a set of radial crimping dies moveable toward each other to crimp the connector radially in compression on the fibers to secure the fibers in the connector. The apparatus includes a set of axial crimping dies moveable toward each other to apply axial force on the connector to prevent separation of optical faces of the fibers and to maintain the optical faces in abutment.

The fibers are installed in the known connector by moving the fibers toward each other until their optical faces abut. Upon an attempt to move the fibers further toward each other, the fibers are observed to buckle instead of moving further toward each other. The fibers are observed to buckle as an indication that the optical faces of the fibers are in abutment and exert pressure on each other. The pressure is retained by crimping the connector and applying axial force to the connector while the fibers are observed to buckle. Accordingly, the apparatus is used in a method for assembling optical fibers in a passage of a connector by applying axial force to the fibers to maintain optical faces of the fibers in abutment.

Difficulty is experienced when excessive pressure damages the optical faces. Pressure may become excessive when the butt splice is assembled with relatively stiff fibers that resist buckling. For example, the stiff fibers resist buckling as the pressure on their abutting optical faces increases to an excessive level and causes damage to the optical faces. There is a need to cause buckling of the fibers before the pressure increases to a level that will damage the fibers.

SUMMARY OF THE INVENTION

According to the invention, a method is provided for assembling an optical fiber in a passage of a connector by applying axial force to the fiber to maintain an optical face of the fiber in abutment with an optical face of an optical device, and for securing the fiber to the connector to maintain the pressure between the abutting optical faces.

The method according to the invention is provided further for imparting a bend along the length of the fiber, and for applying an axial force to the fiber, without restricting further bending of the fiber to apply pressure between abutting optical faces of the fiber, and the optical device.

The method according to the invention advantageously imparts a bend to an optical fiber, such that resistance of the fiber to buckling is substantially reduced. Further bending of the fiber will result when pressure is applied between abutting optical faces of the fiber and an optical device. The fiber will be observed to buckle as an indication that the optical faces are under pressure. Buckling of the bent fiber will occur in response to pressure that is lower than the pressure that would be necessary to buckle an unbent fiber.

Apparatus according to the invention is provided for inserting an optical fiber in a passage of a connector, for imparting a bend in the fiber, and for moving the fiber axially a precise axial displacement for applying an axial force to the fiber to apply pressure between the abutting optical faces of the fiber and an optical device mounted to the connector. The apparatus further straightens the fiber prior to moving the fiber axially.

Further the invention is described by the following description with reference by way of example to the accompanying drawings.

DESCRIPTION OF THE DRAWINGS

FIG. 1 is a perspective view of apparatus for inserting an optical fiber in a passage of a connector.

FIGS. 2 and 3 are plan views, illustrating the apparatus shown in FIG. 1 with an optical fiber in the apparatus.

FIG. 4 is a fragmentary plan view of the apparatus shown in FIG. 1 together with a portion of a connector shown in section into which the optical fiber is inserted.

FIG. 5 is a fragmentary perspective view of two optical fibers and a connector for the optical fibers.

FIG. 6 is a view similar to FIG. 4 and illustrating full insertion of the optical fibers in the connector.

FIG. 7 is a view similar to FIG. 5 and illustrating buckling of the fibers as an indication that their optical faces are in abutment and are exerting pressure on each other.

FIG. 8 is a fragmentary plan view in section of a connector for an optical fiber and another optical device, such as a diode together with a portion of the apparatus shown in FIG. 3.

With reference to FIGS. 5, 6, and 7, a connector 1 is illustrated of the type disclosed in U.S. Pat. No. 4,435,038, and comprises a sleeve 2 and a deformable support member therein, the support member 3 having a plurality of elongate parallel ribs defining a fiber receiving passage 4 therebetween. Termination is accomplished by inserting end portions 5 of two optical fibers 6,7 into the passage 4 and applying a radial crimp to compress the support member 3 to align axially the fibers 6,7. Interstitial spaces between the ribs of the support member 3 are closed up during the crimping such that the support member 3 is deformed radially.

According to the invention, axial force is applied the fiber 6 to be assembled in the connector 1, such that pressure is exerted between an optical face 8 of the fiber 6 and the optical face 9 of the fiber 7, mounted in the connector 1. The fiber 7 is one version of an optical device 7. As shown in FIG. 8, the optical device 7 may comprise, for example, a diode 7, mounted in a differently shaped version of the connector 1 and having the optical face 9 to which the optical face 8 of the fiber 6 abuts. Connection between an optical fiber 6 and a diode 7 is known from U.S. Pat. No. 4,186,996.

The connector 1 of FIGS. 5, 6 and 7 is crimped to retain the pressure exerted by the optical faces 8,9 on each other. Axial creep of the connector 1 tends only to reduce the pressure without causing separation of the optical face 8 of the fiber 6 from the abutting optical face 9.

With reference to FIGS. 5, 6 and 7, the fiber 6 is inserted along the passage 4 by movement of the fiber 6 toward the optical device 7 mounted in the connector 1. The optical faces 8,9 on the ends of the fiber 6 and the optical device 7 abut each other. With reference to FIG. 7, upon an attempt to move the fiber 6 further toward the optical device 7, the fiber 6 is observed to buckle at 10 instead of moving further toward the other optical device 7. The fiber 6 is observed to buckle at 10 as an indication that the optical faces 8,9 of the fiber 6 and the optical device 7 are in abutment and exert pressure on each other. The pressure is retained by crimping the connector 1 and applying axial force to the fiber 6 while the fiber 6 is observed to buckle. When the optical device 7 is an optical fiber 7, each fiber 6,7 is observed to buckle at 10 as an indication that the optical faces 8,9 of the fibers 6,7 are in abutment and exert pressure on each other.

With reference to FIG. 1, apparatus 11 is provided for inserting the optical fiber 6 in the passage 4 of the connector 1, for imparting a bend the fiber 6 and for moving the fiber 6 axially a precise axial displacement for applying an axial force to the fiber 6 to apply pressure between the abutting optical faces 8,9 of the fiber 6 and the optical device 7 mounted to the connector 1. The apparatus 11 further straightens the fiber 6 prior to moving the fiber 6 axially.

The apparatus 11 includes a base 12 machined from metal stock having a channel 13 in communication with a rear end 14 of the base 12. An elongated passage 15 having a funnel entry 16 communicates with the channel 13 and with a front end 17 of the apparatus 1. The passage 15 is slender and slidably receives the optical fiber 6, FIG. 2, that has been inserted along the channel 13 and along the entry 16 of the passage 15 and projects through the front end 17 of the apparatus 11. The optical fiber 6 is of a known construction having a clad core 18 for propagating optical signals by refraction and an enlarged diameter buffer 19 concentrically encircling the clad core 18.

With reference to FIGS. 1, 2 and 3, the apparatus 11 further includes a carriage 20 mounted by rails 21,21 that are journaled for axial reciprocation in corresponding recesses 22 in the carriage 20. A channel 23 communicates with a front 24 of the carriage 20 and with the channel 13 of the base 12, when the front 24 of the carriage 20 abuts the rear 14 of the base 12. The carriage 20 includes a fixed clamp jaw 25 having a clamping surface 26 aligned straight with the straight axis of the passage 15. A moveable clamp jaw 27 mounted on a wall 28 of the carriage 20 is biased by a spring 29 toward the fixed jaw. A biasing means in the form of a cylindrical pin 30 is mounted on the carriage 20 and in the channel 23. The axis of the pin 30 is aligned straight with the axis of the passage 15 and with the surface 26 of the fixed clamping jaw 25. The fiber 6 is laid along the channel 23 of the carriage and between the clamping jaws 25,27. A rearward portion 6A of the fiber 6 is clamped between the jaws 25,27 and is biased by the moveable clamping jaw 27 against the surface 26 of the fixed jaw 25. The fiber 6 is against the cylindrical surface of the pin 30 and is biased laterally by the pin 30. The fiber 6 is straight along the passage 15 and along the fixed jaw 25, but is bent by the pin 30. Thereby, a bend 31 is imparted to the fiber 6 by the pin 30. The fiber 6 is installed in the apparatus 11 as described. Thereafter a lid 32, FIG. 1, pivotally mounted by hinge pins 33 to the base 12 is pivoted to close the passage 15 along its open side. A projecting knob 34 on the lid 32 facilitates pivoting of the lid 32 by hand.

With reference to FIG. 3, the carriage 20 is displaced to a rear direction to retract slidably the optical fiber 6, such that the enlarged diameter buffer portion 19 is retracted along the passage 15. If a front end of the fiber 6 is curved, FIG. 2, due to a bend in the buffer 19, the fiber 6 is straightened by the straight passage 15.

With reference to FIGS. 4 and 8, the front 17 of the apparatus 11 is aligned with the corresponding passage 4 of the corresponding connector 1 and the optical fiber 6 is positioned along the corresponding passage 4 with its optical face 8 facing the optical face 9 of the corresponding optical device 7 mounted to the corresponding connector 1. The fiber 6 projects from the front 17 of the apparatus 11 a distance determined by measurement to project along the passage 4 of the connector 1 to the optical face 9 of the optical device 7 mounted to the connector 1. Thereby, the fiber 6 is inserted along the passage 4 by movement toward the other optical device 7 mounted in the connector 1, until the optical faces 8,9 abut.

For example, the optical device is a diode 7, as shown in FIG. 8. Optical faces 8,9 on the ends of the fiber 6 and the optical device 7 abut each other. The carriage 20 is moved from its position shown in FIG. 3 forwardly to abut the rear 24 of the base 12, displacing the rearward portion 6A of the fiber 6 axially toward the optical device 7 by a predetermined amount of displacement. The amount of displacement is determined by pegs 21A, threadably secured to the carriage 20 and projecting into the recesses 22 for sliding displacement from end to end of recessed tracks 21B in the rails 21. With reference to FIGS. 4 and 8, an attempt to move the abutted fiber 6 further toward the corresponding optical device 7 by movement of the carriage 20, causes the fiber 6 to buckle instead of moving further toward the optical device 7. The fiber 6 is observed to buckle as an indication that the optical faces 8,9 of the fiber 6 and the optical device 7 are in abutment and exert pressure on each other.

In response to the pressure, the fiber 6 is observed to bend further at 31 and bends away from the pin 30, as observed with reference to FIGS. 4 and 8. The channel 23 surrounds the pin 30 and provides a space for unrestricted further bending of the fiber 6. Thereby, axial force is applied to the fiber 6, without restricting further bending of the fiber 6, to apply pressure between abutting optical faces 8,9 of the fiber 6 and the device 7. When the optical device 7 is another fiber 7, as shown in FIG. 4, each fiber 6,7 is assembled in a corresponding apparatus 11 and is observed to buckle as an indication that the optical faces 8,9 of the fibers 6,7 are in abutment and exert pressure on each other.

The fiber 6 when subjected to an axial force is not unlike a compression load applied to a stiff column. A stiff column resists buckling in response to a compression load. Excessive load on the column will cause damage to the column before the column will buckle. It has been observed that an optical face 7 of a stiff optical fiber 6 will be damaged before the fiber 6 buckles under pressure applied to the optical face 7. To prevent such damage, the apparatus 11 applies a bend 31 to the fiber 6 by a predetermined amount and then axially displaces the bent fiber 6 a predetermined amount to apply compression to the abutting optical faces 8,9. Further bending of the fiber 6 is unrestricted, such that, in response to the pressure, the fiber 6 will buckle at 31 before the pressure increases excessively to damage the abutting optical faces 8,9.

The length of travel of the carriage 20 produces a predetermined amount of axial displacement of the fiber 6 after its optical face 8 is abutting the optical face 9 of the optical device 7. The fiber 6 is imparted with a predetermined bend 31 to reduce the column stiffness of the fiber 6. The lateral displacement of the bend 31 measured laterally from the straight axis of the fiber 6 is equal to one-half the diameter of the fiber 6 plus one-half the diameter of the pin 30. The diameter of the pin 30 is selected to impart a corresponding bend 31 in the fiber 6. The bend 31 will reduce the column stiffness of the fiber 6 by an amount depending upon the stiffness of the fiber 6 and the predetermined amount of bend 31 imparted to the fiber. Thus, for a predetermined amount of axial displacement of the fiber 6, the pressure on the optical face 7 of the fiber can be limited by imparting a bend 31 in the fiber 6 to reduce the column stiffness of the fiber 6.

The pressure of the optical faces 8,9 on each other is retained by crimping the connector 1 radially by using radial crimping dies as shown in U.S. Pat. No. 4,727,742. The fibers 6,7, FIG. 1, are secured to the connector 1 by crimping to maintain the pressure between the optical face 8 of the fiber 6 and the abutting optical face 9 of the fiber 7 mounted in the connector 1. In FIG. 8, the fiber 6 is secured to the connector 1 by adhesive such as epoxy, not shown, to maintain the pressure between the optical face 8 of the fiber 6 and the abutting optical face 9 of the optical device 7 mounted in the connector 1. Dies of the patented apparatus of U.S. Pat. No. 4,727,742 for applying axial force are unnecessary, since, axial creep of the connector 1 tends only to reduce the pressure between the optical faces 8,9, and not to separate the abutting optical faces 8,9.

We claim:

1. Apparatus for inserting an optical fiber in a connector, for imparting a bend in the fiber and for applying an axial force to the fiber, thereby to apply pressure between corresponding, abutting optical faces of the fiber and an optical device mounted on the connector, the apparatus including;
   a base,
   a passage in the base receiving an optical fiber for movement therein, and for aligning the optical fiber with and optical device mounted to a connector,
   first means connected on the base for biasing the fiber and for imparting a bend in the fiber out of straight alignment with the passage in the base,
   second means adjacent the first means for allowing unrestricted bending of the fiber by said first means,
   and a third means for clamping the fiber, the third means being displaceable for displacing the fiber axially of its length and along a connector and toward an optical device mounted to such a connector.

2. Apparatus as recited in claim 1, wherein said third means is a clamp for clamping the fiber, the clamp being displaceable together with the fiber for displacing the fiber axially of its length and along a connector and toward an optical device mounted to such a connector.

3. Apparatus as recited in claim 1, wherein said second means is a recess adjacent the first means.

4. Apparatus as recited in claim 1, wherein the means is a pin mounted in straight alignment with the passage of the base.

5. Apparatus as recited in claim 4, wherein said third means is a clamp for clamping the fiber, the clamp being displaceable together with the fiber for displacing the fiber axially of its length and along a connector and toward an optical device mounted to such a connector.

6. Apparatus as recited in claim 4, wherein said second means is a recess adjacent the first means.

7. Apparatus as recited in claim 1, wherein the passage of the base is straight, and the clamp is displaceable axially to a rear of the passage of the base to retract the fiber within the passage of the base.

8. Apparatus as recited in claim 7, wherein the first means is a pin mounted in straight alignment with the passage of the base.

9. Apparatus as recited in claim 7, wherein said second means is a recess adjacent the first means.

10. Apparatus as recited in claim 7, wherein said third means is a clamp for clamping the fiber, the clamp being displaceable together with the fiber for displacing the fiber axially of its length and along a connector and toward an optical device mounted to such a connector.

* * * * *